United States Patent
Mori et al.

(10) Patent No.: US 11,116,202 B2
(45) Date of Patent: Sep. 14, 2021

(54) INDOOR PEST REPELLENT DEVICE, INDOOR PEST ELIMINATION DEVICE, AND METHOD FOR REPELLING PESTS INDOORS

(71) Applicant: I N Pharmaceutical CO., LTD., Tokyo (JP)

(72) Inventors: Toyofumi Mori, Tokyo (JP); Hideyoshi Watanabe, Tokyo (JP)

(73) Assignee: I N Pharmaceutical CO., LTD., Tokyo (JP)

( * ) Notice: Subject to any disclaimer, the term of this patent is extended or adjusted under 35 U.S.C. 154(b) by 0 days.

(21) Appl. No.: 16/762,498

(22) PCT Filed: Nov. 15, 2018

(86) PCT No.: PCT/JP2018/042308
§ 371 (c)(1),
(2) Date: May 7, 2020

(87) PCT Pub. No.: WO2019/098282
PCT Pub. Date: May 23, 2019

(65) Prior Publication Data
US 2020/0375173 A1 Dec. 3, 2020

(30) Foreign Application Priority Data
May 10, 2018 (CN) .......................... 201820691603.4

(51) Int. Cl.
*A01M 29/00* (2011.01)
*A01M 29/10* (2011.01)
(Continued)

(52) U.S. Cl.
CPC ............. *A01M 29/10* (2013.01); *F21S 10/06* (2013.01); *F21V 5/007* (2013.01)

(58) Field of Classification Search
CPC .......... F21V 21/30; F21V 14/02; F21V 14/06; F21V 5/007; F21S 10/06; F21S 10/066; F21S 8/04; A01M 29/10
See application file for complete search history.

(56) References Cited

U.S. PATENT DOCUMENTS 3,013,145 A * 12/1961 Trippe .................. A01M 29/10
362/35
4,295,185 A * 10/1981 Martin .................... F21V 14/06
362/211
(Continued)

FOREIGN PATENT DOCUMENTS

| CN | 204350947 | 5/2015 |
|---|---|---|
| JP | S6117977 | 2/1986 |

(Continued)

OTHER PUBLICATIONS

"Office Action of Korea Counterpart Application", dated Aug. 27, 2020, with English translation thereof, pp. 1-10.
(Continued)

*Primary Examiner* — Y M. Quach Lee
(74) *Attorney, Agent, or Firm* — JCIPRNET

(57) ABSTRACT

This indoor pest repellent device (10) is provided with: a light source (11); a light concentrating part (the first light concentrating part (13)) which concentrates a portion of diffused light (LS) emitted from the light source (11); and a first displacement unit (the rotation mechanism (14)) which changes the relative position of the first light concentrating part (13) relative to the light source (11), and which displaces the irradiation region (the light irradiation region (SP1)) of the light from the first light concentrating part (13), said irradiation region being formed on a floor. The light concentrating part is provided with a convex lens.

10 Claims, 4 Drawing Sheets

(51) Int. Cl.
  *F21S 10/06* (2006.01)
  *F21V 5/00* (2018.01)

(56) References Cited

U.S. PATENT DOCUMENTS

| | | | | |
|---|---|---|---|---|
| 5,607,217 | A * | 3/1997 | Hobbs, II | F21V 21/30 362/286 |
| 9,414,581 | B1 | 8/2016 | Riesland | |
| 10,480,756 | B1 * | 11/2019 | Oh | F21V 21/30 |
| 2006/0077663 | A1 * | 4/2006 | De Ginto | A01M 29/10 362/276 |
| 2012/0032096 | A1 | 2/2012 | Marka et al. | |

FOREIGN PATENT DOCUMENTS

| | | |
|---|---|---|
| JP | 2000060412 | 2/2000 |
| JP | 2003284482 | 10/2003 |
| JP | 2010220542 | 10/2010 |
| JP | 2013230123 | 11/2013 |
| JP | 3198676 | 7/2015 |
| JP | 5946994 | 7/2016 |
| JP | 6387501 | 9/2018 |

OTHER PUBLICATIONS

"Office Action of Canada Counterpart Application," dated Jul. 6, 2020, p. 1-p. 5.
"Office Action of Australia Counterpart Application", dated Jul. 13, 2020, pp. 1-6.
"International Search Report (Form PCT/ISA/210) of PCT/JP2018/042308," dated Feb. 19, 2019, with English translation thereof, pp. 1-4.

* cited by examiner

INDOOR PEST REPELLENT DEVICE, INDOOR PEST ELIMINATION DEVICE, AND METHOD FOR REPELLING PESTS INDOORS

CROSS-REFERENCE TO RELATED APPLICATION

This application is a 371 application of the International PCT application serial no. PCT/JP2018/042308, filed on Nov. 15, 2018, which claims the priority benefits of Japan Patent Application No. 2017-221096, filed on Nov. 16, 2017, and China Patent Application No. 201820691603.4, filed on May 10, 2018. The entirety of each of the above-mentioned patent applications is hereby incorporated by reference herein and made a part of this specification.

BACKGROUND

Technical Field

The invention relates to an indoor pest repellent device, an indoor pest elimination device, and a method for repelling pests indoors, and more particularly relates to a device that emits light for repelling pests which damage indoor arrangements at night.

Description of Related Art

Patent Document 1 describes a pest repelling method that can repel pests approaching an article with LED light of a color repelled by the pests so as to protect the article from being damaged by the pests. The pest repelling method is characterized as follows. A housing that houses two or more LEDs is installed near the article and on a passage through which the pests pass or on a tilting table which forwardly descends. A power switch is turned on so that the two or more LEDs emit light of two or more colors repelled by the pests as blinking light which is on for a time of about 17 msec and is off at an interval of about 1.6 sec. The blinking light is emitted obliquely downward on the area near the article and the passage through which the pests pass, and is reflected above the passage and spreads around. The blinking light that is reflected and spreads is easily perceived by the pests approaching the article from the passage and easily repels the pests.

RELATED ART

Patent Document

[Patent Document 1] Japanese Patent No. 5946994

SUMMARY

Problems to be Solved

The invention provides an indoor pest repellent device which is a device for repelling pests indoors, an indoor pest elimination device provided with the indoor pest repellent device, and an indoor pest repelling method.

Means for Solving the Problems

In view of the above, the invention provided is as follows.
(1) An indoor pest repellent device is characterized in including: a light source; a light concentrating part concentrating a portion of light emitted from the light source; and a first displacement unit changing a relative position of the light concentrating part relative to the light source and displacing an irradiation region of light from the light concentrating part, which is formed on a floor, and the light concentrating part includes a convex lens.
(2) In the indoor pest repellent device according to (1), the first displacement unit includes a rotation mechanism, and the light concentrating part is rotationally moved by the rotation mechanism.
(3) The indoor pest repellent device according to (2) includes two or more light concentrating parts, and the light concentrating parts are rotationally moved by the rotation mechanism.
(4) In the indoor pest repellent device according to any one of (1) to (3), a plurality of light sources are provided.
(5) In the indoor pest repellent device according to (4), at least one of the plurality of light sources is arranged at a position shifted from a rotation axis of the rotation mechanism.
(6) In the indoor pest repellent device according to any one of (1) to (5), the light source blinks.
(7) An indoor pest elimination device includes: the indoor pest repellent device according to any one of (1) to (6); and a door that is able to move only from indoors where the indoor pest repellent device is provided, to outdoors.
(8) An indoor pest repelling method includes: attaching the indoor pest repellent device according to any one of (1) to (6) to a ceiling or a wall, and displacing an irradiation region of light formed on a floor or the wall by the indoor pest repellent device.

Effects

By using the indoor pest repellent device according to the invention, it is possible to expel pests that damage indoor arrangements from the indoor space or to keep the pests from approaching the indoor space. In addition, with the indoor pest elimination device provided with the indoor pest repellent device according to the invention, indoor pests can be efficiently eliminated to the outdoors. The invention also provides an indoor pest repelling method.

BRIEF DESCRIPTION OF THE DRAWINGS (a) of FIG. 1 is a diagram illustrating the structure and operation of a pest repellent device according to an embodiment of the invention, and (b) of FIG. 1 is a diagram showing the result of tracing a light irradiation region which the pest repellent device forms on a floor.

DESCRIPTION OF THE EMBODIMENTS

Figure 1:
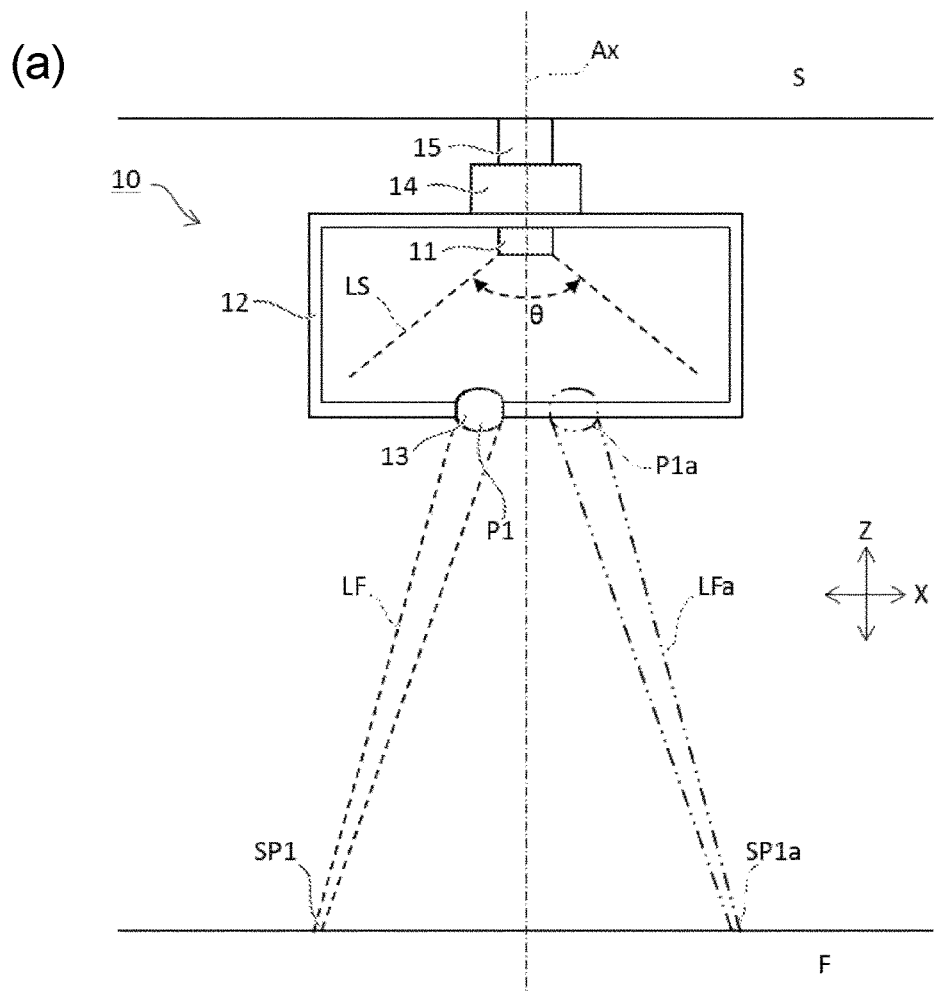
Figure 1:
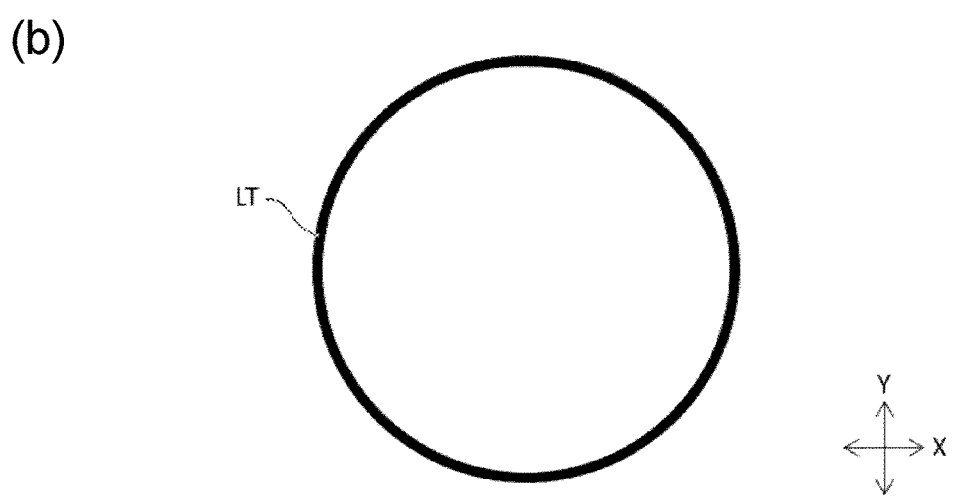

Hereinafter, embodiments of the invention will be described with reference to the drawings. In the following description, the same members are assigned with the same reference numerals, and the description of the members that have been described will be omitted where appropriate.

(a) of FIG. 1 is a diagram illustrating the structure and operation of a pest repellent device (indoor pest repellent device) according to an embodiment of the invention.

In the pest repellent device 10 shown in (a) of FIG. 1, a light source 11 capable of emitting diffused light LS at a solid angle θ is arranged inside a housing 12. The light source 11 is an LED light source. The housing 12 is rotatable by a rotation mechanism 14 that has a rotation axis Ax in the vertical direction (Z-axis direction in (a) of FIG. 1). The rotation mechanism 14 is attached to a ceiling S of a building by a mounting member 15. In the pest repellent device 10 according to the present embodiment, one light source (light source 11) is arranged in the housing 12, and the central axis of the diffused light LS from the light source 11 in the radiation direction overlaps the rotation axis Ax.

A first light concentrating part 13 having a light concentrating function, such as a convex lens, is provided on the lower side of the housing 12 within an irradiation range of the diffused light LS from the light source 11 arranged above the housing 12. The first light concentrating part 13 is capable of concentrating a portion of the diffused light LS emitted from the light source 11 on the outside of the housing 12. Specifically, a portion of the diffused light LS emitted on the first light concentrating part 13 arranged at a first position P1 is transmitted through the first light concentrating part 13 and is emitted to the outside of the housing 12, and at this time, the light concentrating function of the first light concentrating part 13 converts the diffused light into converged light LF and forms a light irradiation region SP1 on a floor F.

When the housing 12 is rotated about the rotation axis Ax by the rotation mechanism 14, the light source 11 is not displaced, and the first light concentrating part 13 rotates about the rotation axis Ax. For example, when the housing 12 is rotated 180 degrees by the rotation mechanism 14, the first light concentrating part is located at a second position P1a. As a result, the converged light LFa emitted from the first light concentrating part 13 to the outside of the housing 12 reaches a region (light irradiation region SP1a) different from the light irradiation region SP1 on the floor F.

When the light irradiation region SP1 formed by the converged light LF emitted from the first light concentrating part 13 of the housing 12, which is rotated by the rotation mechanism 14, is traced, as shown in (b) of FIG. 1, an annular region LT is formed. The light irradiation region SP1 moves so as to go around this region.

According to the result of the study performed by the inventors, the inventors found that moving the light irradiation region (afterimage) on the floor F or the like repels pests more effectively than blinking light as described in Patent Document 1. The pests to be repelled include not only mammals such as rats and moles or birds such as crows, but also arthropods including insects such as cockroaches and flies or spiders. The pest repellent device 10 according to the present embodiment is configured based on such finding. When the light irradiation region SP1 moves around on the floor F, the pests to be repelled may misidentify the light irradiation region SP1 as their predators or exterminators and not easily approach the floor F.

The light irradiation region SP1 may move in the entire region of the annular region LT, or the light irradiation region SP1 may move in a portion of the region LT by, for example, blinking of the light source 11. If the blinking is performed irregularly, it may be difficult for the pests to be repelled to notice that the light irradiation region SP1 moves only in the annular region LT, and the degree of repelling of the pests may be increased. In the pest repellent device 10 according to the present embodiment, the housing 12 is configured so that the light from the light source 11 is not emitted from portions other than the first light concentrating part 13 attached to the housing 12. With such a configuration, it is possible to prevent phototaxis pests (such as insects) from approaching the light leaked from the housing 12.

Figure 2:
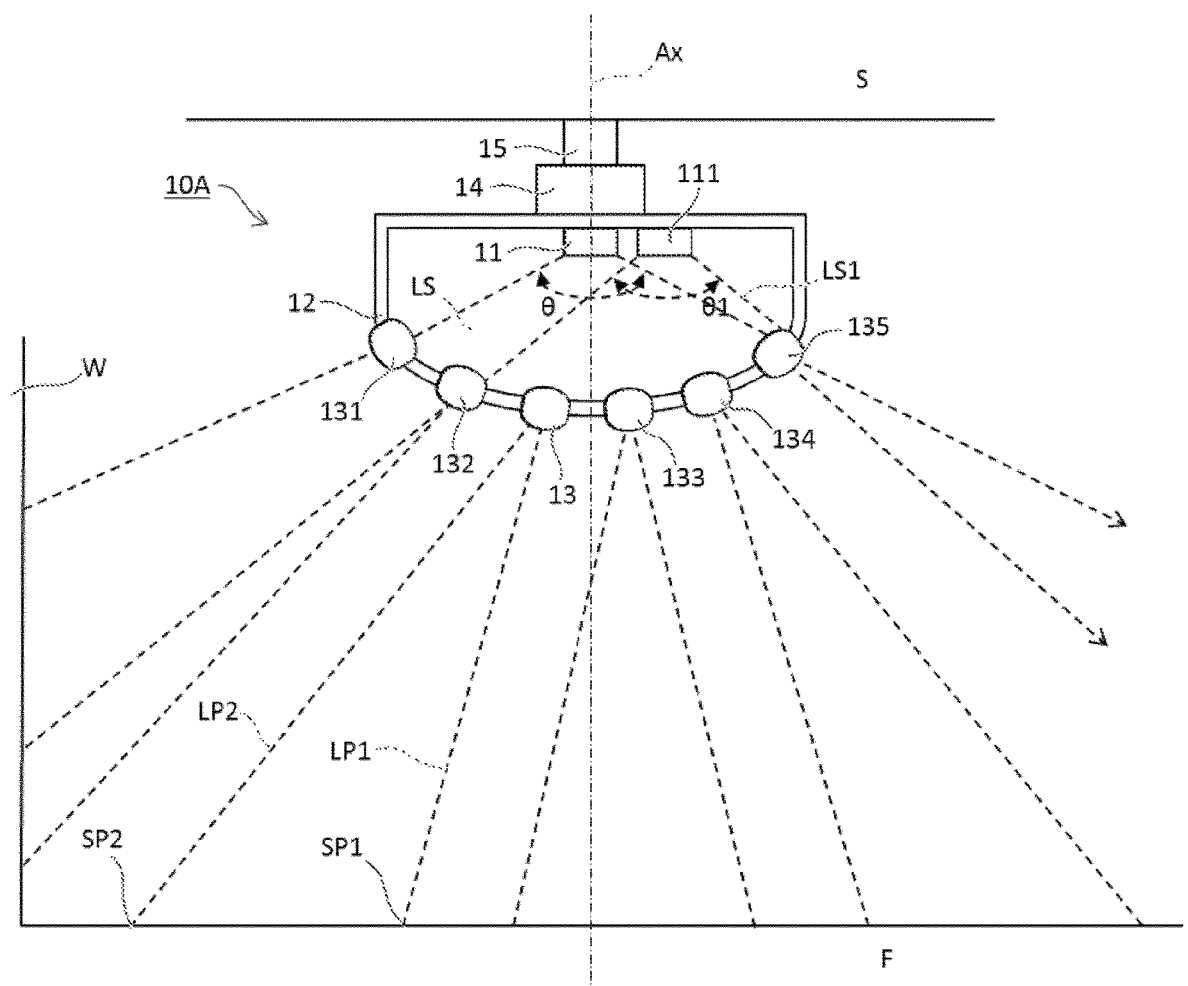
FIG. 2 is a diagram illustrating the structure and operation of a pest repellent device according to another embodiment of the invention.

FIG. 2 is a diagram illustrating the structure and operation of a pest repellent device according to another embodiment of the invention.

The pest repellent device 10A shown in FIG. 2 differs from the pest repellent device 10 shown in (a) of FIG. 1 in the following two points.

First, in the pest repellent device 10A, a light source 111 capable of emitting diffused light LS1 at a solid angle θ1, similar to the light source 11, is further arranged in the housing 12. The light source 111 is different from the light source 11 in that the light source 111 is at a position where the emission center of the diffused light LS1 is shifted from the rotation axis Ax of the rotation mechanism 14. Thus, when the housing 12 is rotated by the rotation mechanism 14, the light source 111 also rotates around the rotation axis Ax.

Furthermore, the housing 12 is provided with a plurality of light concentrating parts. Specifically, in addition to the first light concentrating part 13, the housing 12 includes five light concentrating parts including a second light concentrating part 131, and the other four are shown as a light concentrating part 132, a light concentrating part 133, a light concentrating part 134, and a light concentrating part 135 in FIG. 2. These light concentrating parts concentrate a portion of the diffused light emitted from the light source 11, which is different from the portion of light concentrated by the first light concentrating part 13, to form a light irradiation region on the floor F or a wall surface W.

For the first light concentrating part 13, a light path LP1 that concentrates a portion of the light emitted from the light source 11 forms a light irradiation region SP1 on the floor F, and a light path LP2 that concentrates a portion of the light emitted from the light source 111 forms a light irradiation region SP2 on the floor F at a position different from the position of the light irradiation region SP1. Since the light source 11 and the light source 111 are at different positions, the annular region LT formed by the light irradiation region SP1 does not match the annular region formed by the light irradiation region SP2. Thus, the light irradiation region SP1 and the light irradiation region SP2 move on different trajectories, which increases the effect of repelling the pests to be repelled.

The light irradiation regions based on the light source 11 and the light irradiation regions based on the light source 111, from the other light concentrating parts (the light concentrating part 132, the light concentrating part 133, the light concentrating part 134, and the light concentrating part 135) are also formed on the floor F or the wall surface W, and each region moves in its own annular region. When a large number of light irradiation regions move individually on the floor F or the wall surface W, the pests to be repelled cannot predict the trajectories of the light irradiation regions and may get into a panic. In addition, when the light irradiation regions are formed not only on the floor F but also on the wall surface W, the pests to be repelled may recognize that the escape route has been cut off and further become confused. Therefore, the pests may be captured by an adhesive-type pest capturing device that can be easily avoided by pests in normal cases.

As described above, the present embodiment provides a pest repellent device that scares indoor pests so that they cannot stay indoors.

Figure 3:
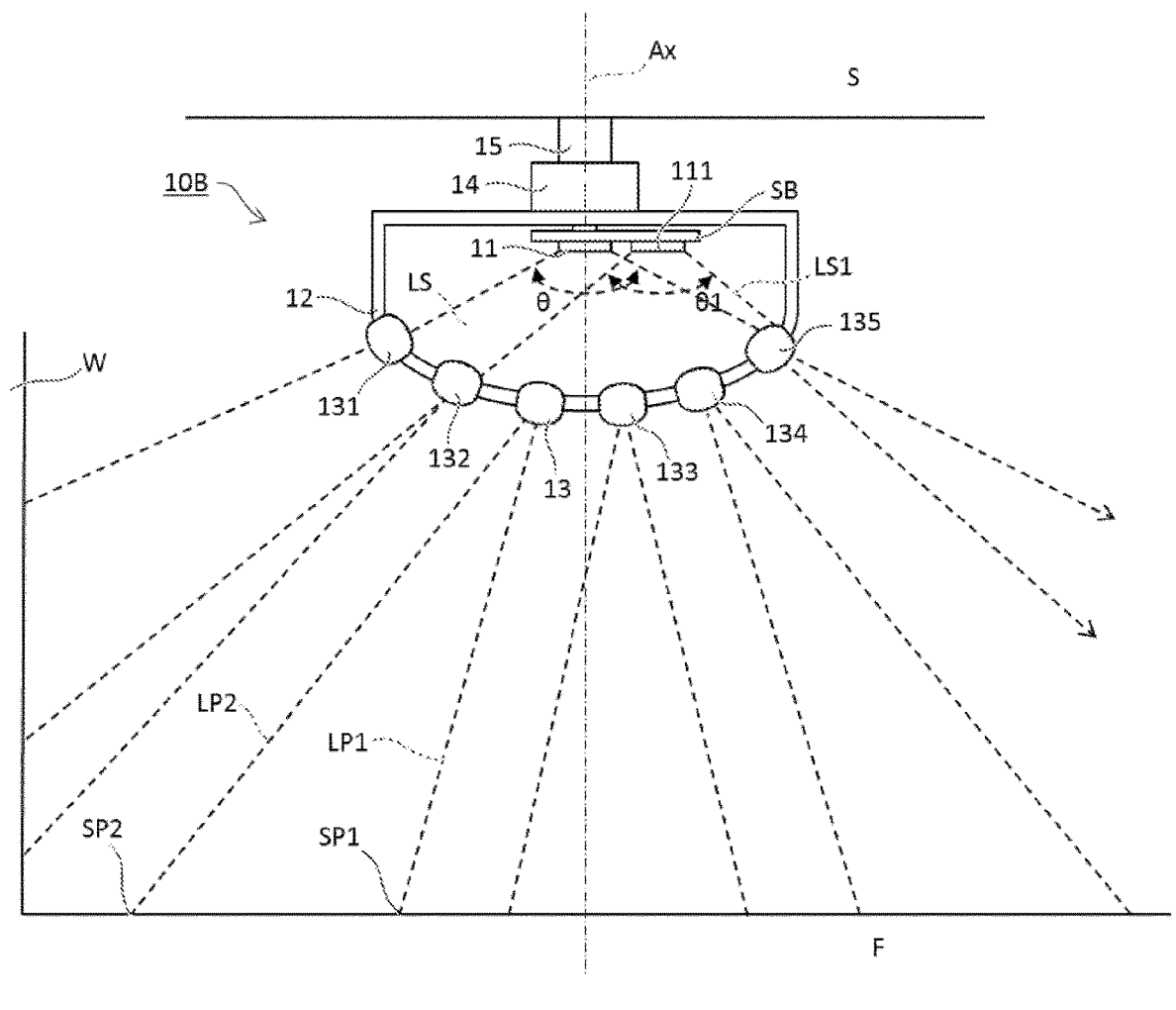
FIG. 3 is a diagram illustrating the structure and operation of a pest repellent device according to a modified example of another embodiment of the invention.

FIG. 3 is a diagram illustrating the structure and operation of a pest repellent device according to a modified example of another embodiment of the invention. In the pest repellent device 10A, the light source 11, etc., and the first light concentrating part 13, etc., are both fixed to the housing 12, and as a result, the light source and the light concentrating part rotate while maintaining the same relative position. On the other hand, in a pest repellent device 10B according to the present example, the light sources 11 and 111 are arranged on a substrate SB, and the substrate SB is inside the housing 12 but located independently of the housing 12 and does not rotate with the rotation of the rotation mechanism 14. In this case, a portion of the diffused light from the light source may not be emitted to each light concentrating part constantly. For example, the second light concentrating part 131 may be constantly irradiated by a portion of the diffused light LS from the light source 11, but not irradiated by the diffused light LS1 from the light source 111.

Although the embodiments have been described above, the invention is not limited to these examples. Those skilled in the art may add components to or delete components from the above embodiments or change the design as appropriate, or properly combine the features of the configuration example of each embodiment, which also falls within the scope of the invention as long as it includes the gist of the invention.

For example, in the above-described embodiment, the housing 12 has a structure that the diffused light LS from the light source 11, etc., does not leak to the outside. However, the invention is not limited thereto. In another aspect, the diffused light LS may be reflected on the inner surface of the housing 12. In that case, since light including the reflected light is concentrated at the first light concentrating part 13, in some cases, it is possible to increase the area of the light irradiation region SP1 or increase the light irradiation region without increasing the light sources.

In the specific example, the first light concentrating part 13 has a convex lens shape that simply converts the diffused light LS into the converged light LF. However, the invention is not limited thereto. An optical system for projecting a predetermined shape (for example, a star shape) to the floor F may be used. When a plurality of light sources (the light source 11 and the light source 111) are configured to blink, the intervals of blinking between the light sources may be different. Irregular movement of the light irradiation region resulting from the blinking is effective for the pests to be repelled. Therefore, it is not necessary to strictly control the intervals of blinking as in Patent Document 1.

The color of the light source 11 is also arbitrary. The colors may be different or the same. The light source 11 may be composed of an LED, or a diffusing plate may be provided in the light path of irradiation from an LD to diffuse light. In the above-described embodiment, the rotation mechanism 14 corresponding to the first displacement unit that displaces the light irradiation region SP1 of the converged light from the first light concentrating part 13 is common to the second displacement unit that displaces the light irradiation region of the converged light from the second light concentrating part 131. However, the invention is not limited thereto. The displacement units for displacing the light irradiation regions from respective light concentrating parts may be provided individually.

Figure 4:
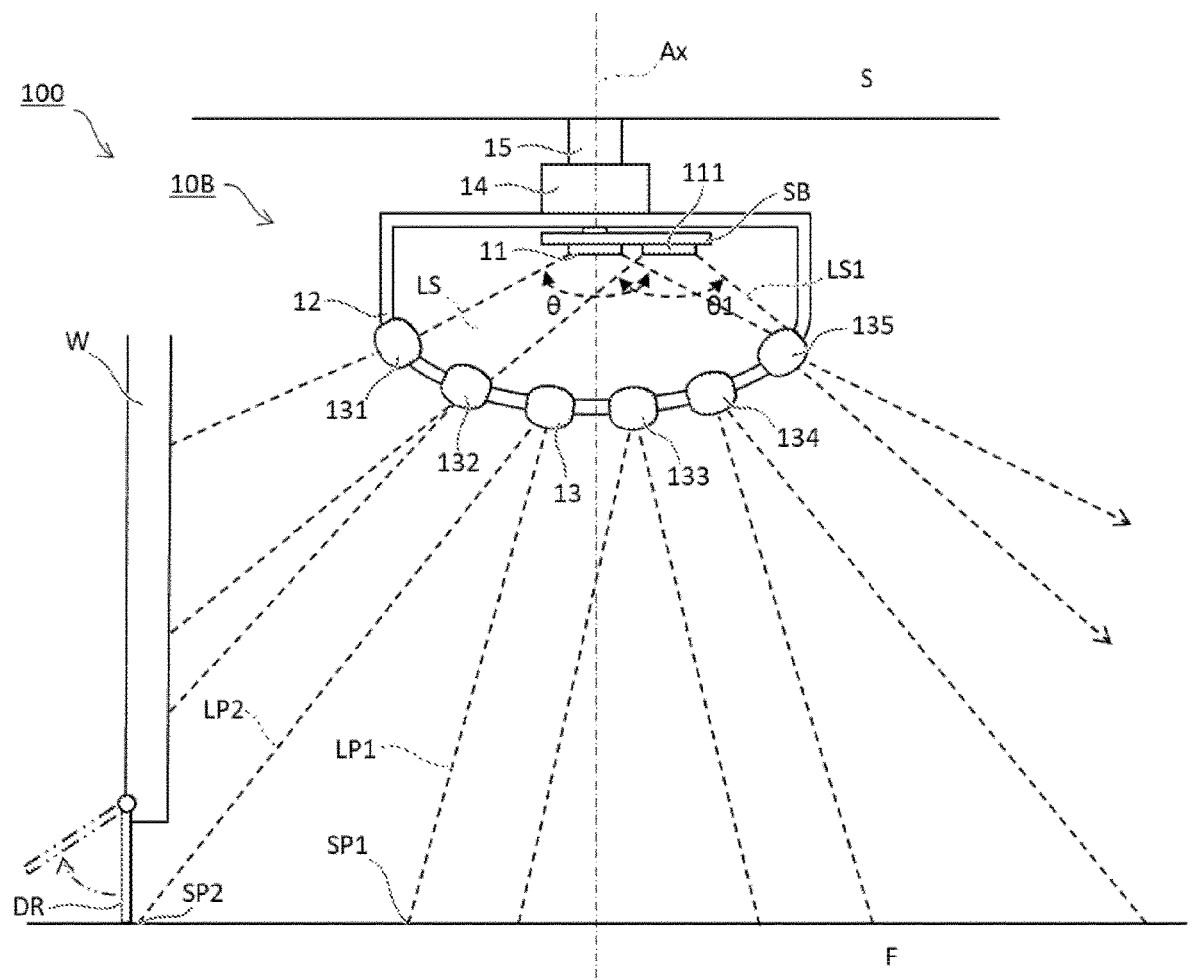
FIG. 4 is a diagram illustrating the structure and operation of a pest elimination device according to an embodiment of the invention.

As shown in FIG. 4, a door DR that can only move from indoors to outdoors may be provided on the wall W. In that case, the pests can escape outdoors from the door DR while the pest repellent device 10B is operating, and it is not required to capture the pests. Thus, the indoor pest elimination device 100, which includes the pest repellent device 10, 10A, or 10B and the door DR that can only move from indoors to outdoors, is capable of efficiently eliminating indoor pests.

The indoor pest repellent devices 10, 10A, and 10B may be provided on the wall surface W.

What is claimed is:

1. An indoor pest repellent device, comprising:
   a light source;
   a housing having two or more light concentrating parts, wherein light emitted from the light source is transmitted through each of the two or more light concentrating parts to be emitted to outside of the housing, and each of the two or more light concentrating parts concentrates a portion of the light emitted from the light source; and
   a first displacement unit changing a relative position of each of the two or more light concentrating parts relative to the light source and displacing an irradiation region of light from each of the two or more light concentrating parts, which is formed on a floor,
   wherein each of the two or more light concentrating parts comprises a convex lens,
   the first displacement unit comprises a rotation mechanism, wherein the two or more light concentrating parts are rotationally moved by the rotation mechanism but the light source is not rotated by the rotation mechanism,
   the two or more light concentrating parts are arranged apart from each other, and
   the housing is configured such that the light from the light source is not emitted from portions other than the two or more light concentrating parts.

2. The indoor pest repellent device according to claim 1, wherein a plurality of light sources are provided.

3. The indoor pest repellent device according to claim 2, wherein at least one of the plurality of light sources is arranged at a position shifted from a rotation axis of the rotation mechanism.

4. The indoor pest repellent device according to claim 1, wherein the light source blinks.

5. An indoor pest repelling method, comprising: attaching the indoor pest repellent device according to claim 1 to a ceiling, and displacing an irradiation region of light formed on a floor by the indoor pest repellent device.

6. An indoor pest repellent device, comprising:
   a light source;
   a housing having two or more light concentrating parts each concentrating a portion of light emitted from the light source; and
   a first displacement unit changing a relative position of each of the two or more light concentrating parts relative to the light source and displacing an irradiation region of light from each of the two or more light concentrating parts, which is formed on a floor,
   wherein each of the two or more light concentrating parts comprises a convex lens,
   the first displacement unit comprises a rotation mechanism, wherein the two or more light concentrating parts are rotationally moved with the housing by the rotation mechanism but the light source is not rotated by the rotation mechanism,
   the two or more light concentrating parts are arranged apart from each other, and the housing is configured such that the light from the light source is not emitted from portions other than the two or more light concentrating parts.

7. The indoor pest repellent device according to claim 6, wherein a plurality of light sources are provided.

8. The indoor pest repellent device according to claim 7, wherein at least one of the plurality of light sources is arranged at a position shifted from a rotation axis of the rotation mechanism.

9. The indoor pest repellent device according to claim 6, wherein the light source blinks.

10. An indoor pest repelling method, comprising: attaching the indoor pest repellent device according to claim 6 to a ceiling, and displacing an irradiation region of light formed on a floor by the indoor pest repellent device.

* * * * *